Figure 1:
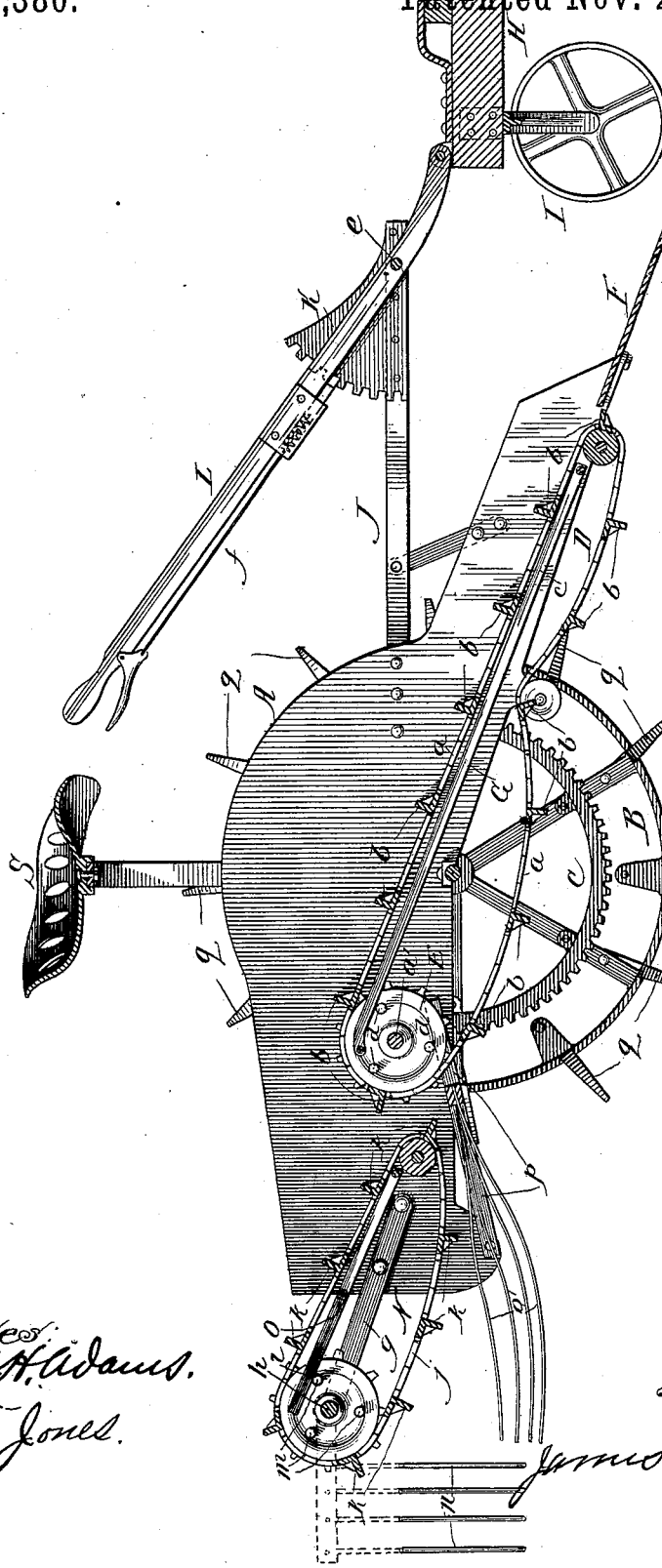

(No Model.) 2 Sheets—Sheet 1.

J. McCALLUM.
POTATO DIGGER.

No. 393,380. Patented Nov. 27, 1888.

Witnesses:
Albert H. Adams.
Harry T. Jones.

Inventor:
James McCallum

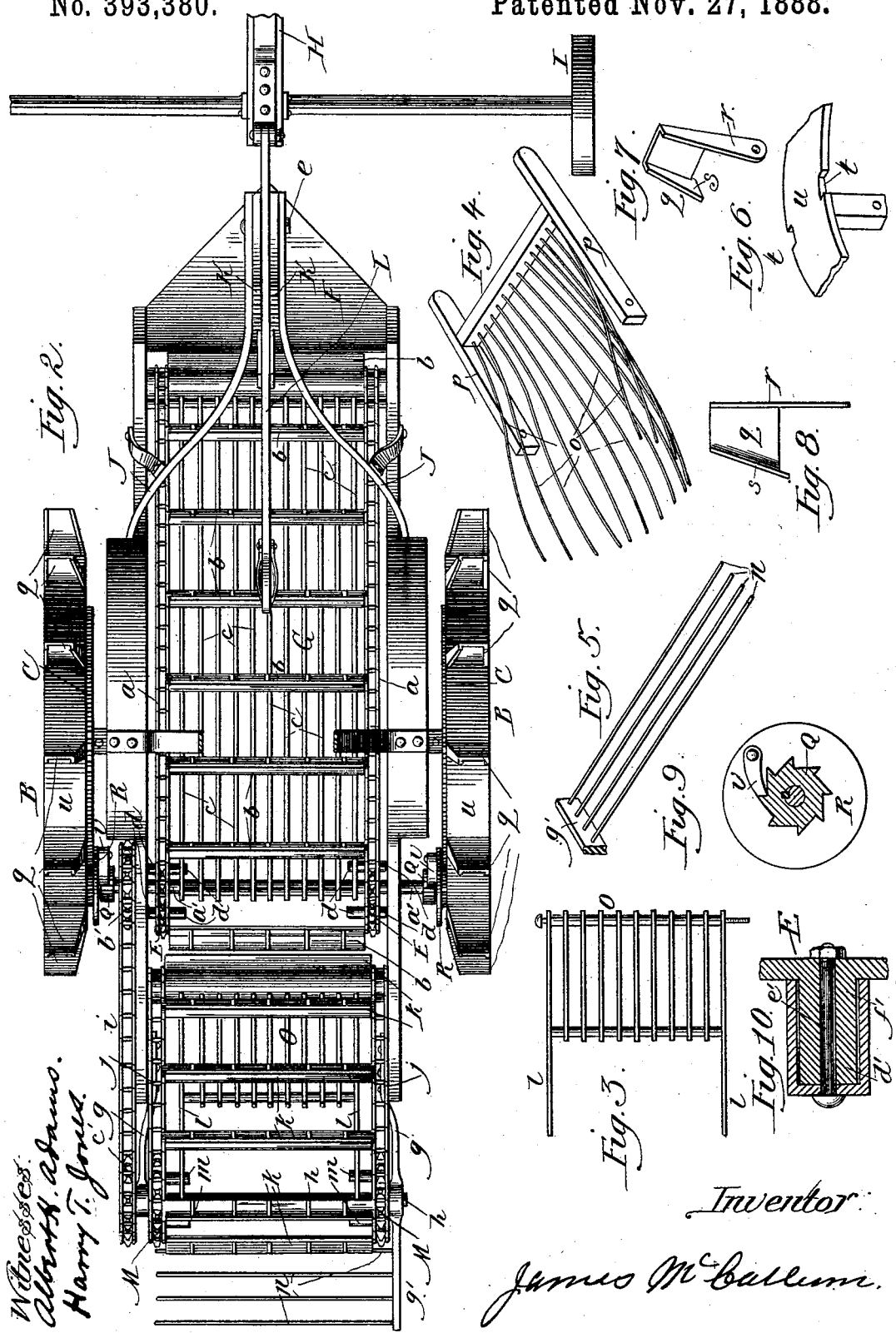

UNITED STATES PATENT OFFICE.

JAMES McCALLUM, OF ELGIN, ILLINOIS, ASSIGNOR TO THE J. McCALLUM MANUFACTURING COMPANY, OF SAME PLACE.

POTATO-DIGGER.

SPECIFICATION forming part of Letters Patent No. 393,380, dated November 27, 1888.

Application filed January 3, 1888. Serial No. 259,727. (No model.)

*To all whom it may concern:*

Be it known that I, JAMES McCALLUM, residing at Elgin, in the county of Kane and State of Illinois, and a subject of the Queen of Great Britain, have invented a new and useful Improvement in Potato-Diggers, of which the following is a specification, reference being had to the accompanying drawings, in which—

Figure 1 is a central longitudinal vertical section. Fig. 2 is a plan. Fig. 3 is a detail, being a plan of one of the riddles. Fig. 4 is a detail, being a perspective of the delivering-rods and frame to which they are attached. Fig. 5 is a detail, being a perspective of part of the rods from which the vines and weeds are delivered. Fig. 6 is a detail in perspective, showing a portion of the rim of one wheel and one arm or spoke. Figs. 7 and 8 are details showing one of the grabs secured to the arms. Fig. 9 is an enlarged detail of one pinion with its flange and the ratchet-wheel and pawl. Fig. 10 is an enlarged sectional detail showing the construction of the tappets.

My invention relates to that class of potato-diggers which have a main frame mounted on wheels and an endless carrier and a riddle operating within the frame.

The objects of my invention are to provide improved devices for carrying away the vines and weeds and delivering them to one side, to provide improved devices for the adjustment of the pitch and depth of cutting of the shovel, and to make other minor improvements, which I accomplish as illustrated in the drawings and hereinafter set forth.

Those things which I claim as new will be set forth in the claims.

In the drawings, A represents the main frame, which is mounted on main wheels B B, each of which is provided with a gear-wheel, C, which drive the operating parts, as usual.

D is an endless carrier, which consists of two endless chains, $a$, and cross-bars $b$, secured to the chains.

E E are two sprocket-wheels on a shaft, $a'$, which is supported in suitable bearings, which sprocket-wheels drive the endless carrier D.

F is a shovel secured to the front end of the frame A.

G is a riddle composed of longitudinal bars $c$ and suitable cross bars. The front end of this riddle is pivoted to the main frame.

$d$ are tappets on the sprocket-wheels E, arranged to engage with the upper end of the riddle G and agitate it.

H is the tongue to which the draft-animals are to be secured. It is supported, as shown, by a crank-axle, which is supported by wheels I.

J J are bars, the rear ends of which are secured to the main frame, and the forward ends are brought near together. Secured to the forward end of each bar, as shown, is a segmental rack, K.

L is a lever, the forward end of which is pivoted to the rear end of the tongue. The lever is also pivoted between the two arms or bars J, near their forward ends, and at the point $e$.

$f$ is a lock or latch, the forward end of which is arranged to engage with the segmental rack and hold the lever L in any desired position.

$g$ are bars secured to the rear end of the main frame. $h$ is a shaft supported in said bars $g$.

M are sprocket-wheels on the shaft $h$, which are driven by a chain, $i$, which passes over a sprocket-wheel, $b'$, on the shaft $a'$ and over another sprocket-wheel, $c'$, on the shaft $h$, as shown in Fig. 2.

N is an endless carrier, which consists of two endless chains, $jj$, and cross bars $k$, which carrier is driven by the sprocket-wheels M.

O is a riddle pivoted at its front end to the main frame. The side bars, $l$, of the riddle extend to the rear some distance beyond the riddle itself and engage with tappets $m$ on the sprocket-wheels M, by which this riddle is agitated.

$n$ are a series of inclined fingers or rods at the rear of the machine, which are supported at one end by an arm, $g'$, which may be an extension of one of the bars $g$.

$o$ are a series of fingers or rods secured at one end to the cross-bar of a frame, which frame is pivoted at its rear end to the main frame. The side bars, $p$, of the last-mentioned frame are arranged to engage with tappets on the outside of the sprocket-wheels E, by which the frame $p$ and rods $o$ are agitated. The rear ends of these rods $o$ are arranged in a curved line and form a grate.

$q$ are grabs, each having an arm, $r$, on one side and a flange, $s$, on the other. The arm and flange enter notches $t$ in the rim $u$ of the wheel, and are secured to the wheel by a bolt which passes through the projecting end of the arm $r$ and through one of the spokes or through a bracket secured to the inside of the wheel-rim.

$v$ is a pawl which is pivoted at one end to the pinion R. The other end engages with the ratchet-wheel Q. As shown, on the opposite side of the machine there is a corresponding ratchet-wheel and pawl, and the pawl is pivoted to a flange on the pinion.

S is a driver's seat.

The tappets $d\,m$ are of peculiar construction. Each consists of a lug, $f''$, cast on the sprocket-wheel, and a cup-washer, $d'$, secured in place on the lug by a bolt, $e'$, which construction will add much to the durability of the tappets, because when the washer becomes worn it can be easily turned around, and also replaced by a new one when worn out. This construction is not shown in Fig. 1, the parts being too small, but is shown in Fig. 10. The riddle O or the frame $p$, with the delivery-rods $o$, can be readily removed from the machine, and it is not necessary to use both at the same time; but both are important, one or the other being used according to circumstances.

The operation is as follows: The potatoes and vines, when the machine is in motion, will pass up over the shovel to the carrier D, and by it they will be carried up over the riddle G, the dirt falling through the riddle, and the potatoes and vines will be delivered at the upper end of the carrier D and will be received by the carrier N. The vines will be delivered to the rods $n$, from which they will fall to the ground at one side; but the potatoes will be carried up over the riddle O and will fall from the upper end thereof. When this riddle O is used, the delivery rods $o$ and the frame $p$ will not be required and may be removed from the machine. The potatoes may be delivered from the upper end of the riddle O to a receptacle holding, say, a bushel, which may be arranged to receive them, such receptacle being secured to the main frame, as usual. This receptacle I have not shown, as it forms no part of my present invention. If desired, the riddle O may be removed, the delivery-rods $o$ and frame $p$ being then attached to the machine, in which case the vines will be delivered as before; but the potatoes will fall through the endless carrier N onto the delivery-rods $o$ and be delivered in a compact line upon the ground.

The inclination and depth of cutting of the shovel can be readily adjusted by means of the lever L.

The grabs are arranged at a little angle with the spokes of the wheels, whereby there is little resistance as they pass out of the ground. By removing the bolt which fastens each one of the grabs to the wheel the grabs can be removed and secured in place in a reverse position, which is important when moving from one place to another. The pinions which engage with the wheels C are not shown in Figs. 1 and 2, being concealed by the wheels. The pawls can be lifted away from the ratchets by hand whenever desired.

What I claim as new, and desire to secure by Letters Patent, is—

1. In a potato-digger, the combination, with a main frame carrying a shovel and wheels, B B, of the reversible grabs $q$, secured thereto and each provided with an arm, $r$, and a flange, $s$, an endless carrier, D, a riddle, G, a second carrier, N, a removable riddle, O, arm $g'$, and inclined fingers $u$, supported thereby, substantially as described.

2. In a potato-digger, the combination, with a main frame mounted on wheels and carrying a shovel, of a tongue supported on wheels, bars J, secured to the main frame and having segmental racks secured to their forward ends, and a lever, L, provided with locking mechanism, pivoted directly to the tongue and also to the bars J, an endless carrier, D, sprocket-wheel E, a riddle, G, and tappets consisting of a lug and a cap-washer held in place upon the lug on said wheel, and a removable frame, $p$, carrying the delivery-rods $o$, substantially as described.

3. In a potato digger, the combination, with a main frame mounted on wheels and carrying a shovel and the endless carrier D, of the riddle G, sprocket-wheel E, having tappets $d$, a second carrier, N, sprocket-wheels M, and an agitating frame consisting of a series of fingers, $o$, side bars, $p$, pivoted to the main frame, and a cross-bar to which said fingers are secured, the side bars, $p$, engaging with tappets on the outside of sprocket-wheels E, substantially as described.

4. The reversible grabs $q$, each provided with an arm, $r$, and a flange, $s$, in combination with a notched wheel-rim provided with spokes or brackets to which the grabs are secured at an angle with the spokes or brackets, substantially as and for the purposes specified.

JAMES McCALLUM.

Witnesses:
ALBERT H. ADAMS,
HARRY T. JONES.